(12) United States Patent
Frota de Souza Filho

(10) Patent No.: US 9,669,468 B2
(45) Date of Patent: Jun. 6, 2017

(54) TOOLHOLDER ASSEMBLY

(71) Applicant: Kennametal Inc., Latrobe, PA (US)

(72) Inventor: Ruy Frota de Souza Filho, Latrobe, PA (US)

(73) Assignee: KENNAMETAL INC., Latrobe, PA (US)

(*) Notice: Subject to any disclaimer, the term of this patent is extended or adjusted under 35 U.S.C. 154(b) by 140 days.

(21) Appl. No.: 14/133,837

(22) Filed: Dec. 19, 2013

(65) Prior Publication Data

US 2015/0174667 A1 Jun. 25, 2015

(51) Int. Cl.

| B23B 29/00 | (2006.01) |
|---|---|
| B23B 31/107 | (2006.01) |
| B23B 29/04 | (2006.01) |
| B23B 31/00 | (2006.01) |
| B23B 31/26 | (2006.01) |

(52) U.S. Cl.
CPC .......... *B23B 31/1071* (2013.01); *B23B 29/04* (2013.01); *B23B 29/046* (2013.01); *B23B 31/005* (2013.01); *B23B 31/263* (2013.01); *B23B 2231/0208* (2013.01); *B23B 2231/0224* (2013.01); *B23B 2231/48* (2013.01); *Y10T 279/17743* (2015.01); *Y10T 279/17752* (2015.01)

(58) Field of Classification Search
CPC ......... Y10T 82/2589; Y10T 409/30952; Y10T 409/309464; Y10T 279/17743; Y10T 279/17752; B23B 31/263; B23B 31/1071; B23B 2231/48; B23B 29/04; B23B 31/005; B23B 29/046; B23B 2231/0208; B23B 2231/0224
See application file for complete search history.

(56) References Cited

U.S. PATENT DOCUMENTS

| 4,680,999 | A | * | 7/1987 | Kojima et al. ................. 82/160 |
|---|---|---|---|---|
| 4,736,659 | A | | 4/1988 | Erickson |
| 4,740,122 | A | | 4/1988 | Glaser |
| 4,834,597 | A | | 5/1989 | Andersson et al. |
| 4,934,883 | A | | 6/1990 | Andersson et al. |
| 5,279,194 | A | | 1/1994 | Armbrust |
| 5,722,806 | A | | 3/1998 | Erickson et al. |
| 7,748,718 | B2 | | 7/2010 | Brettell |
| 8,220,804 | B2 | | 7/2012 | Erickson |
| 2010/0196113 | A1 | * | 8/2010 | Erickson et al. ......... 408/239 R |
| 2010/0201083 | A1 | * | 8/2010 | Hangleiter ..................... 279/50 |

* cited by examiner

*Primary Examiner* — Eric A Gates
*Assistant Examiner* — Paul M Janeski
(74) *Attorney, Agent, or Firm* — Matthew S. Bedsole

(57) ABSTRACT

A toolholder assembly includes a toolholder having a toolholder shank with a non-circular cross-section, a base member having a bore with a non-circular cross-section that receives the toolholder shank, a canister positioned in the base member, a lock rod positioned in the canister, a locking ball for cooperating with the lock rod, the canister and/or the toolholder shank and an actuating element configured for cooperation with the lock rod for moving the lock rod between a locked position and an unlocked position.

20 Claims, 6 Drawing Sheets

TOOLHOLDER ASSEMBLY

BACKGROUND OF THE INVENTION

The invention is directed to tooling for machining operations and, more particularly, directed to a toolholder assembly.

Minimizing the down time of a machine tool in a production environment is critical to the success of a machining operation. In the past, one major contribution to such down time was the time needed to change damaged or worn out cutting tools used by the machine tool.

Typically, a cutting tool is held by a toolholder, which is often mounted within a tool support or base member secured to a machine tool. In early tooling systems when the cutting tool needed to be replaced, the entire toolholder with the cutting tool attached thereto was removed from the support or base member. As a result of the large amount of time consumed by such tooling systems, so called "quick change" tooling systems were created. One such example is described in U.S. Pat. No. 8,220,804 entitled "Toolholder Assembly With Axial Clamping Mechanism" which is owned by the Assignee of the present application and is hereby fully incorporated herein by reference. Another example is described in U.S. Pat. No. 4,736,659 entitled "Toolholder Assembly for Holding a Toolholder Shank" which is co-owned by the Assignee of the present application and is hereby fully incorporated herein by reference. Yet another example is set forth in U.S. Pat. No. 5,279,194 entitled "Ball Lock Assembly Without a Canister" which is owned by the Assignee of the present application and is hereby fully incorporated herein by reference.

While the arrangements in the referenced '804, '659 and '194 patents are efficient and permit a toolholder to be removed or secured to a tool support member in a short amount of time, there is still a need for improved tooling systems having other desirable characteristics such as, for example, increased strength and durability.

SUMMARY OF THE INVENTION

In one aspect of the invention, a toolholder assembly having a central longitudinal axis includes: a toolholder having a rearwardly facing toolholder shank and an axial rearward end with an internal bore intersecting the axial rearward end, the toolholder shank having an outer surface that has a non-circular cross-section and at least one locking aperture that extends from the outer surface to the internal bore; a base member having an axial forward end and a bore intersecting the axial forward end, wherein the bore extends rearwardly therefrom along a longitudinal axis for receiving the toolholder shank; a canister configured for receipt in the bore of the base member, the canister having an outer surface and a canister bore that extends longitudinally through the canister, the canister having at least one locking passageway that extends from the outer surface of the canister to the canister bore and the at least one locking passageway is in communication with the at least one locking aperture of the toolholder shank; a lock rod with an axial forward and an axial rearward end, the lock rod having at least one depression formed adjacent the axial forward end thereof and the at least one depression is in communication with the at least one locking passageway and the at least one locking aperture; a locking member movably positioned at least partially in the at least one depression, the at least one locking passageway and/or the at least one locking aperture; and an actuating element configured for cooperation with the axial rearward end of the lock rod for moving the lock rod within the canister in a rearward and forward reciprocating motion.

In another aspect of the invention, toolholder assembly includes: a toolholder having a rearwardly facing toolholder shank with an internal bore, wherein the toolholder shank has an outer surface that has a non-circular cross-section and at least one locking aperture that extends from an outer surface of the toolholder shank to the internal bore; a base member having a bore that receives the toolholder shank, wherein an axial forward portion of the bore of the base member that receives the toolholder shank has a non-circular cross-section; a canister configured for receipt in the bore of the base member, the canister having at least one locking passageway that extends from an outer surface of the canister to a canister bore, wherein the at least one locking passageway is in communication with the at least one locking aperture of the toolholder shank; a lock rod having at least one depression formed adjacent an axial forward end thereof, wherein the at least one depression is in communication with the at least one locking passageway and the at least one locking aperture; a locking ball movably positioned at least partially in the at least one depression, the at least one locking passageway and/or the at least one locking aperture; and an actuating element configured for cooperation with the lock rod for moving the lock rod between a locked position and an unlocked position.

BRIEF DESCRIPTION OF THE DRAWINGS

The above, as well as other features and advantages of the invention, will become apparent upon consideration of the detailed descriptions in connection with the several drawings in which.

DETAILED DESCRIPTION

Figure 1:
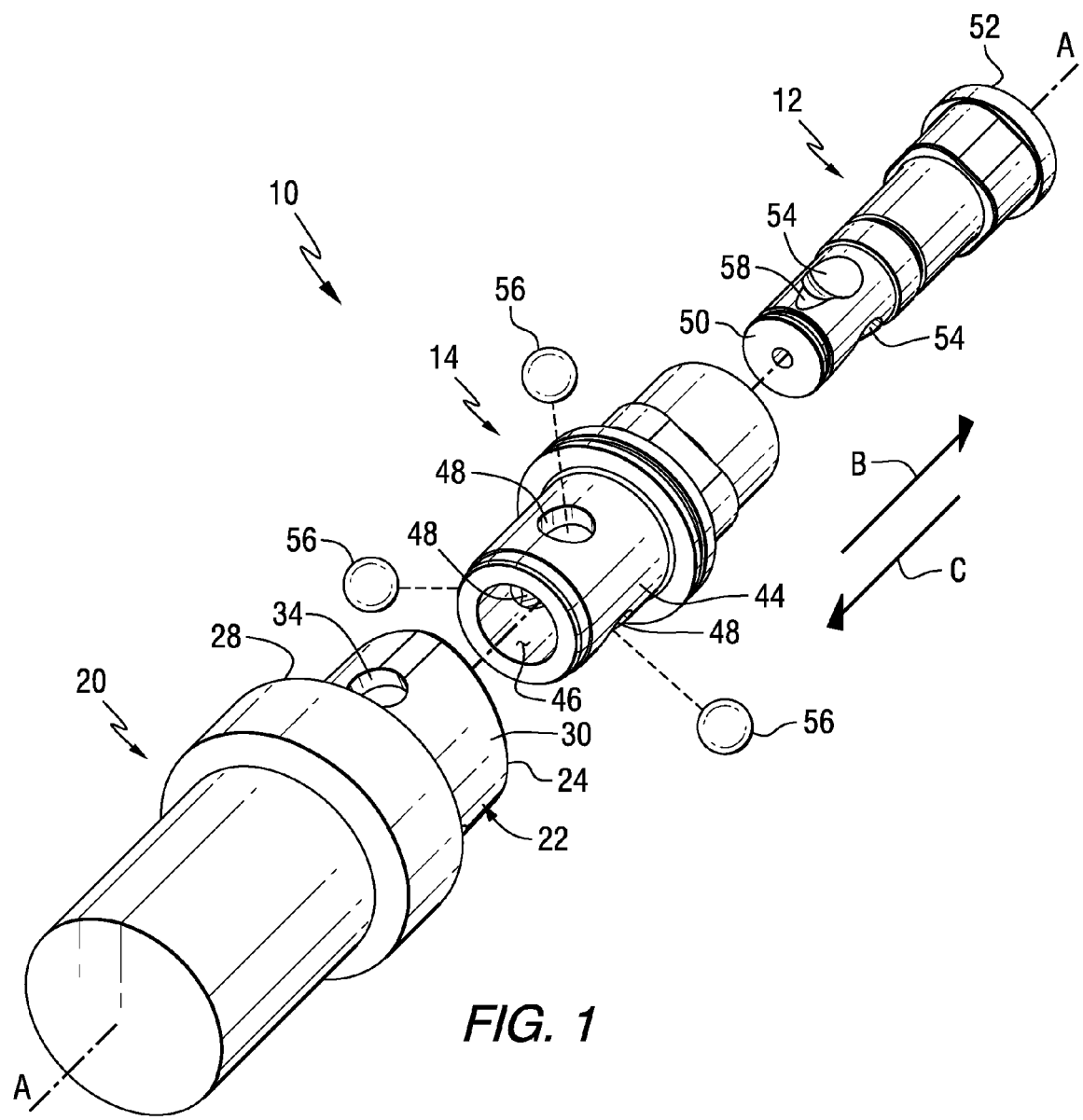
FIG. 1 is an exploded isometric view of a portion of a toolholder assembly, in accordance with an aspect of the invention.
Figure 2:
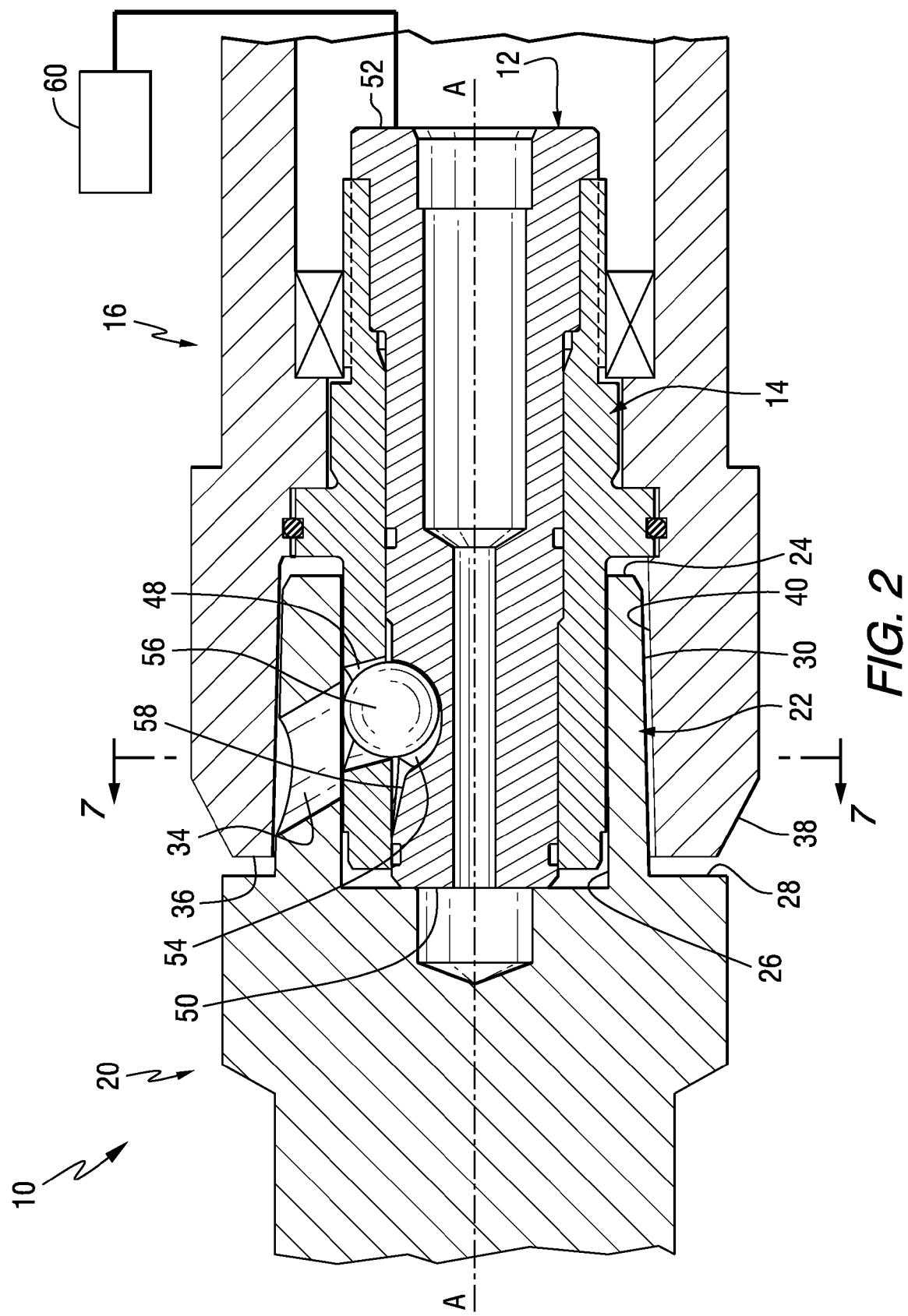
FIG. 2 is a partial cross-section of the toolholder assembly in an unlocked position, in accordance with an aspect of the invention.

Referring to FIGS. 1-7, an aspect of the invention is for a toolholder assembly 10 to move a lock rod 12 back and forth along a central longitudinal axis A-A within a canister 14 and a base member 16 to secure or lock a toolholder 20 within the base member 16 (FIG. 3) or to eject or unlock the toolholder 20 from the base member 16 (FIG. 2). The toolholder assembly 10 illustrated and described herein is typical of a toolholder used for non-rotating tooling such as, for example, a lathe. However, it should be understood that the toolholder assembly 10 may have attached to it any one of a variety of tools that may be associated with either non-rotating or rotating applications.

The toolholder 20 has a rearwardly facing toolholder shank 22 that tapers axially rearwardly toward an axial rearward end 24. In addition, an internal bore 26 intersects the axial rearward end 24 and extends at least partially through the shank 22. The toolholder 20 also has a rearwardly facing abutment surface 28 from which the toolholder shank 22 extends.

Figure 4:
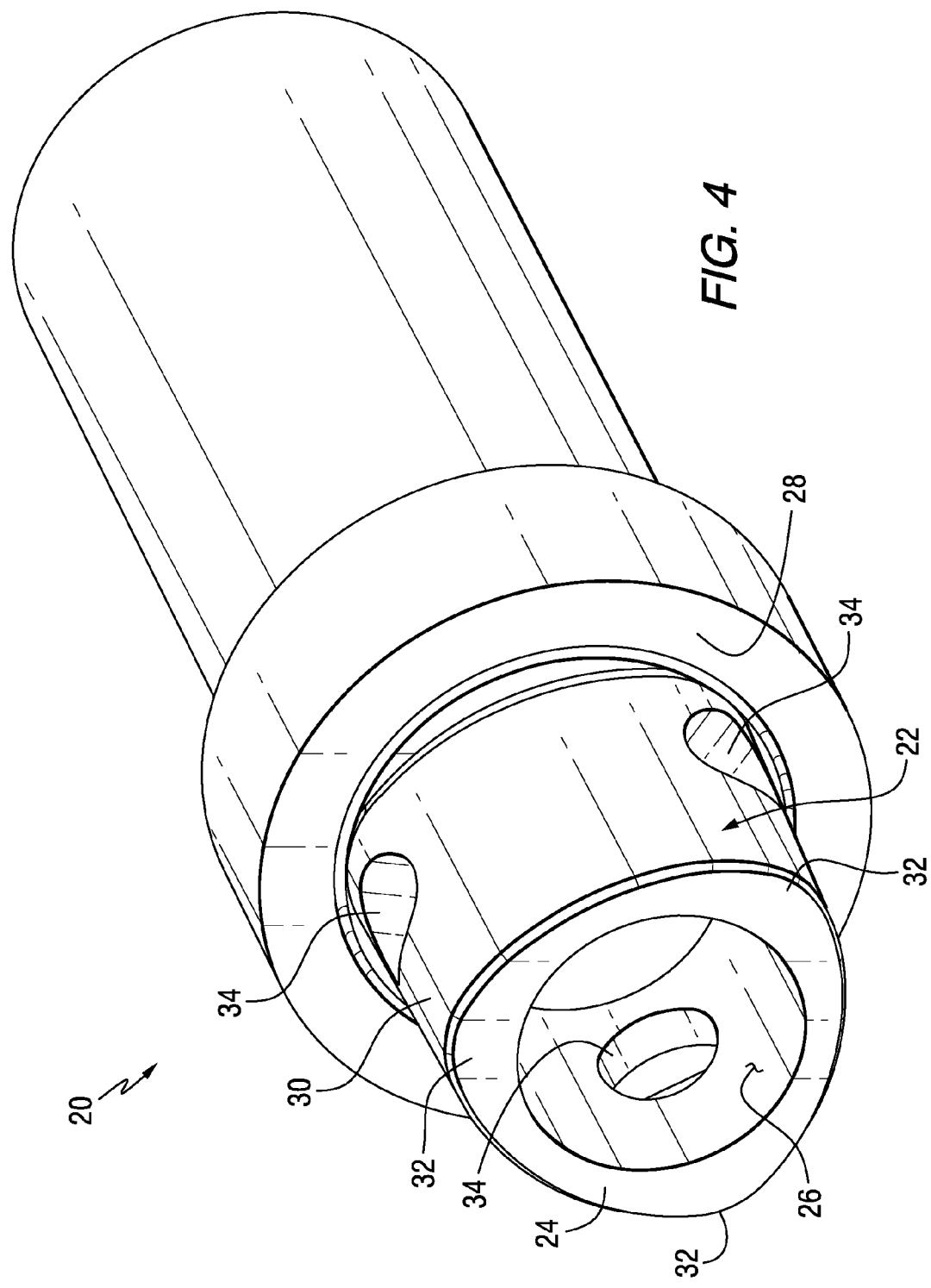
FIG. 4 is an isometric view of a toolholder shown in FIGS. 1-3, in accordance with an aspect of the invention.
Figure 5:
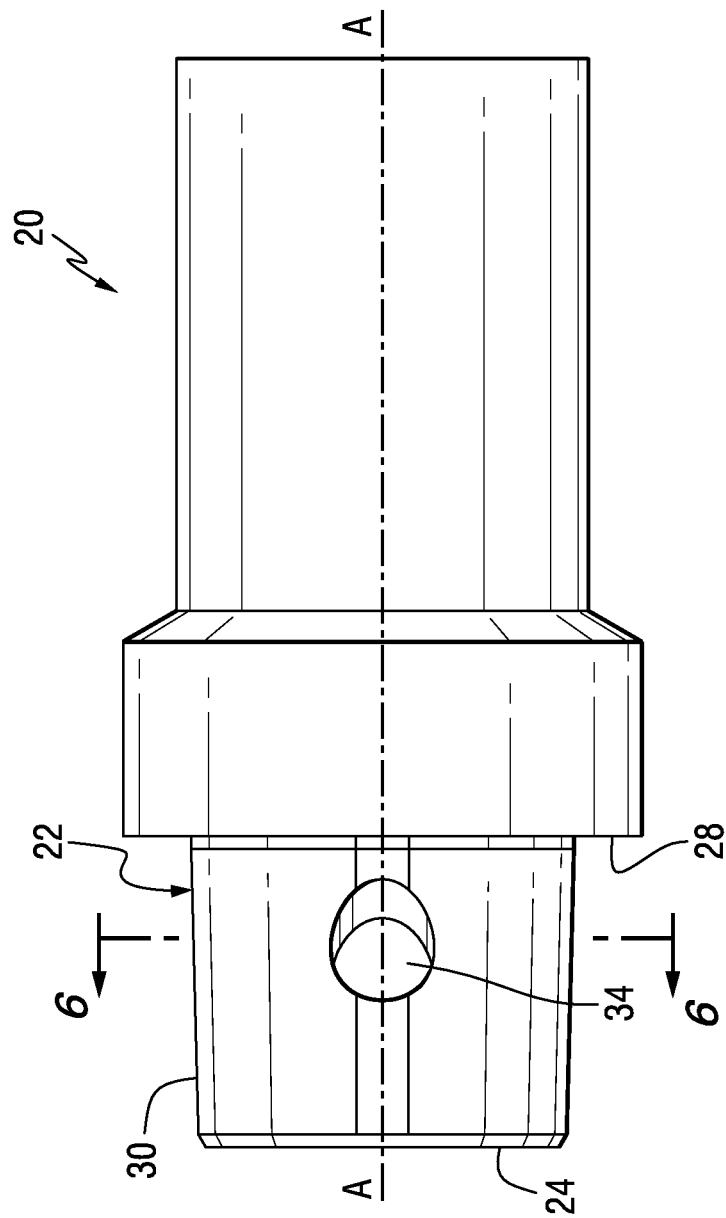
FIG. 5 is a side view of the toolholder, in accordance with an aspect of the invention.
Figure 6:
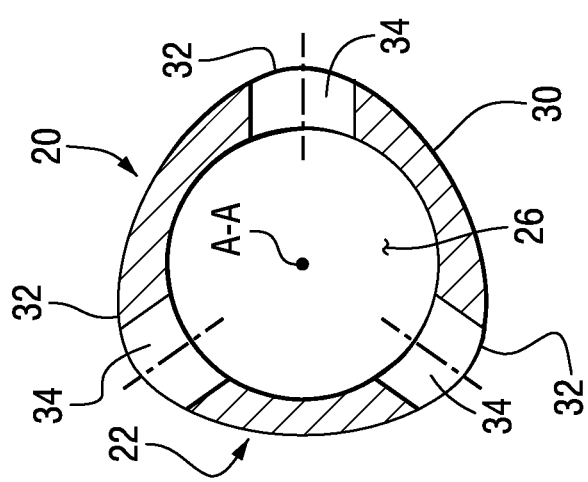
FIG. 6 is a cross-sectional view taken along line 6-6 of FIG. 5, in accordance with an aspect of the invention.

The toolholder shank 22 has an outer surface or shank wall 30 that has a non-circular cross-section. In one aspect, the non-circular cross-section of the outer surface 30 of the toolholder shank 22 is perpendicular to the central longitudinal axis A-A. In another aspect, the non-circular cross-section of the outer surface 30 of the toolholder shank 22 is a tri-lobe configuration. For example, as shown in FIGS. 4 and 6, the tri-lobe configuration includes three lobes 32 equally spaced apart about a perimeter of the outer surface 30. It will be appreciated that other non-circular cross-section configurations or shapes may be provided in accordance with the invention.

The toolholder shank 22 further includes at least one locking aperture 34 that extends from the outer surface or shank wall 30 therethrough to the internal bore 26. In one aspect, the at least one locking aperture 34 of the toolholder shank 22 includes three locking apertures 34 equally spaced apart about the toolholder shank 22 (see FIG. 4).

The base member 16 has a forwardly facing surface 36 at an axial forward end 38 thereof and a bore 40 intersecting the forwardly facing surface 36. The bore 40 extends rearwardly therefrom along the central longitudinal axis A-A for receiving the shank 22 of the toolholder 20.

The toolholder shank 22 is configured to be able to move in and out of the bore 40 of the base member 16. To accommodate such movement, an axial forward portion of the bore 40 of the base member 16 that receives the toolholder shank 22 has a non-circular cross-section. In one aspect, the non-circular cross-section of the bore 40 of the base member 16 is perpendicular to the central longitudinal axis A-A. In another aspect, the bore 40 has substantially the same non-circular cross-section as the outer surface 30 of the shank 22 wherein the bore 40 is larger than the outer surface 30 to allow the in and out movement. Thus, the non-circular cross-section of the bore 40 of the base member 16 is complimentary to the non-circular cross-section of the outer surface 30 of the toolholder shank 22.

Figure 7:
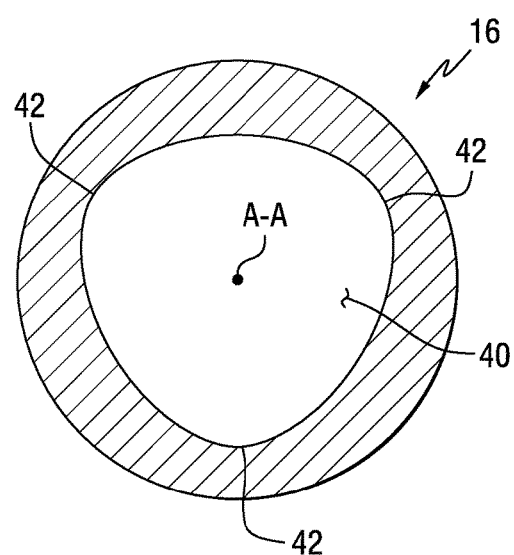
FIG. 7 is a cross-sectional view of a base member taken along line 7-7 of FIG. 2 with other parts of the toolholder assembly removed, in accordance with an aspect of the invention.

In another aspect, the non-circular cross-section of the bore 40 of the base member 16 is a tri-lobe configuration. For example, as shown in FIG. 7, the tri-lobe configuration includes three lobes 42 equally spaced apart about a periphery of the bore 40. It will be appreciated that other non-circular cross-section configurations or shapes may be provided in accordance with the invention.

The canister 14 is configured for receipt in the bore 40 of the base member 16. The canister 14 includes an outer surface 44 and a canister bore 46 that extends longitudinally through the canister 14. In addition, the canister 14 has at least one locking passageway 48 that extends from the outer surface 44 of the canister 14 therethrough to the canister bore 46. In one aspect, the at least one locking passageway 48 is positionable so as to be in communication with the at least one locking aperture 34 of the toolholder shank 22. In another aspect, the at least one locking passageway 48 of the canister 14 includes three locking passageways 48 equally spaced apart about the canister 14.

The lock rod 12 has an axial forward 50 and an axial rearward end 52. The lock rod also has at least one depression 54 formed adjacent the axial forward end 50 thereof. In one aspect, the at least one depression 54 is positionable so as to be in communication with the at least one locking passageway 48 and the at least one locking aperture 34. In another aspect, the at least one depression 54 of the lock rod 12 includes three depressions 54 equally spaced apart about the lock rod 12 (see FIG. 2 which illustrates two depressions 54 with a third depression on side of lock rod 12 not shown. In yet another aspect, it will therefore be appreciated that each of the three depressions 54 are in communication with a respective one of the three locking passageways 48 and the three locking apertures 34.

The toolholder assembly 10 further includes a locking member 56 movably positioned at least partially in the at least one depression 54, the at least one locking passageway 48 and/or the at least one locking aperture 34. The locking member 56 is configured to move radially outwardly and radially inwardly in the at least one depression 54, the at least one locking passageway 48 and/or the at least one locking aperture 34 to respectively secure or lock the toolholder 20 within the base member 16 (FIG. 3) or to eject or unlock the toolholder 20 from the base member 16 (FIG. 2). In one aspect, each locking member 56 is a ball. In another aspect, each locking member 56 is generally spherical.

In another aspect, the invention includes three locking members 56 (see FIG. 1). In addition, it will therefore be appreciated that the invention provides for three locking members 56 to be movably positioned at least partially in a respective one of the three depressions 54, the three locking passageways 48 and the three locking apertures 34.

Figure 3:
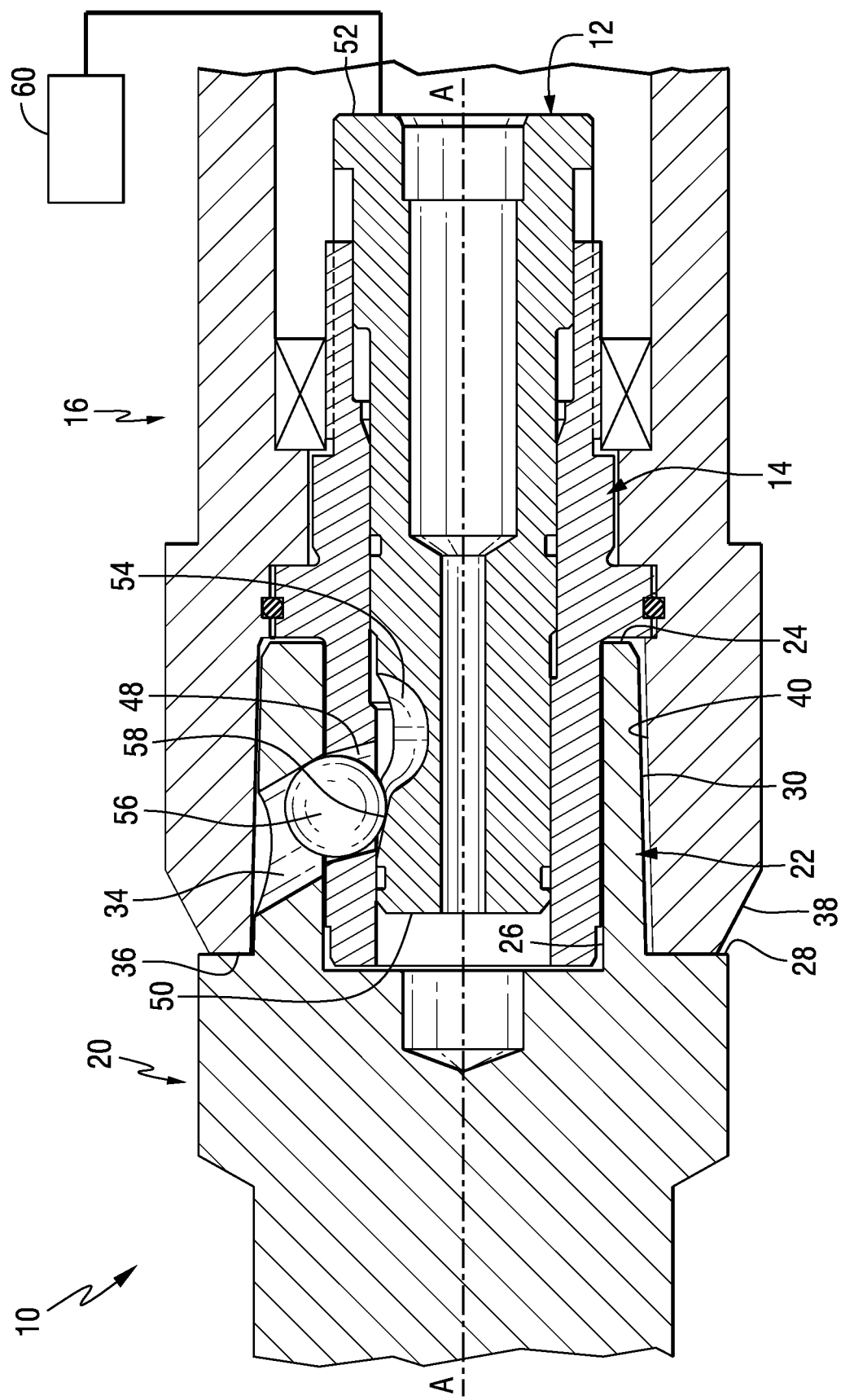
FIG. 3 is a partial cross-section of the toolholder assembly in a locked position, in accordance with an aspect of the invention.

The at least one depression 54 of the lock rod 12 can further include a ramp portion 58 such that the locking member 56 is positioned at least substantially on the ramp portion 58 when the toolholder shank 22 is in a locked position (FIG. 3).

The toolholder assembly 10 further includes an actuating element 60 configured for cooperation with the lock rod 12 for moving the lock rod within the canister 14 in an axially rearward (arrow B in FIG. 1) and an axially forward reciprocating motion (arrow C in FIG. 1). In one aspect, the actuating element 60 is configured for cooperation with the axial rearward end 52 of the lock rod 12. In another aspect, the actuating element 60 is configured for pulling the toolholder shank 22 rearwardly within the bore of the base member into a locked position (FIG. 3) and for releasing the toolholder shank 22 from the bore 40 to an unlocked position (FIG. 2).

In one example, the actuating element 60 may be similar to or essentially the same as the actuating mechanism described and disclosed in U.S. Pat. No. 8,220,804 which has been incorporated by reference hereinabove. In addition, other suitable actuating elements, means for actuating, actuating mechanisms or the like may be used with the aspects of the invention set forth herein.

Accordingly, it will be appreciated that the invention provides for an improved toolholder assembly 10 that advantageously combines to provide: (1) high stiffness under bending loads due to its high clamping force provided by the locking members 56 cooperating with the respective one of the three depressions 54, the three locking passageways 48 and the three locking apertures 34 as described herein; and (2) high torsional stiffness due to the interaction between the tri-lobe 32 configurations of the toolholder shank 22 and the tri-lobe 42 configurations of the bore 40 of the base member 16 as also described herein.

While specific aspects of the invention have been described in detail, it will be appreciated by those skilled in the art that various modifications and alternatives to those details could be developed in light of the overall teachings of the disclosure. The various aspects of the invention described herein are meant to be illustrative only and not limiting as to the scope of the invention which is to be given the full breadth of the appended claims and any and all equivalents thereof.

What is claimed is:

1. A toolholder assembly having a central longitudinal axis, comprising:
   a toolholder having a rearwardly facing toolholder shank and an axial rearward end with an internal bore intersecting the axial rearward end, the toolholder shank having:
      an outer surface that has a cross-section comprising a tri-lobe configuration define by three lobes; and
      at least one locking aperture that extends from the outer surface to the internal bore;
   a base member having an axial forward end and a bore intersecting the axial forward end, wherein the bore extends rearwardly therefrom along the central longitudinal axis for receiving the toolholder shank;
   a canister configured for receipt in the bore of the base member, the canister having an outer surface and a canister bore that extends longitudinally through the canister, the canister having at least one locking passageway that extends from the outer surface of the canister to the canister bore and the at least one locking passageway is in communication with the at least one locking aperture of the toolholder shank;
   a lock rod with an axial forward and an axial rearward end, the lock rod having at least one depression formed adjacent the axial forward end thereof and the at least one depression is in communication with the at least one locking passageway and the at least one locking aperture;
   a locking member movably positioned at least partially in the at least one depression, the at least one locking passageway and/or the at least one locking aperture; and
   an actuating element configured for cooperation with the axial rearward end of the lock rod for moving the lock rod within the canister in a rearward and forward reciprocating motion;
   wherein the lock rod and locking member and locking member cooperate in effecting a clamping force at at least one of the lobes, to secure the toolholder with respect to the base member;
   wherein the locking member comprises a first locking member;
   wherein the toolholder assembly further comprises second and third locking members; and
   wherein the lock rod cooperates with the first, second and third locking members in effecting a clamping force solely at each of the three lobes, to secure the toolholder with respect to the base member.

2. The toolholder assembly according to claim 1, wherein an axial forward portion of the bore of the base member that receives the toolholder shank has a non-circular cross-section.

3. The toolholder assembly according to claim 2, wherein the non-circular cross-section of the bore of the base member is a tri-lobe configuration.

4. The toolholder assembly of according to claim 2, wherein the non-circular cross-section of the bore of the base member is complimentary to the tri-lobe configuration of the outer surface of the toolholder shank.

5. The toolholder assembly according to claim 1, wherein the actuating element is configured for pulling the toolholder shank rearwardly within the bore of the base member into a locked position and for releasing the toolholder shank from the bore to an unlocked position.

6. The toolholder assembly according to claim 1, wherein the tri-lobe configuration of the outer surface of the toolholder shank is perpendicular to the central longitudinal axis.

7. The toolholder assembly according to claim 1, wherein the locking member is a ball.

8. The toolholder assembly according to claim 1, wherein the at least one locking aperture of the toolholder shank includes three locking apertures equally spaced apart about the toolholder shank.

9. The toolholder assembly according to claim 8, wherein the at least one locking passageway of the canister includes three locking passageways equally spaced apart about the canister.

10. The toolholder assembly according to claim 9, wherein the at least one depression of the lock rod includes three depressions equally spaced apart about the lock rod.

11. The toolholder assembly according to claim 10, wherein each of the three depressions are in communication with a respective one of the three locking passageways and the three locking apertures.

12. The toolholder assembly according to claim 11, further including three locking members movably positioned at least partially in a respective one of the three depressions, the three locking passageways and the three locking apertures.

13. The toolholder assembly according to claim 1, wherein the at least one depression of the lock rod includes a ramp portion such that the locking member is positioned on the ramp portion when the toolholder shank is in a locked position.

14. The toolholder assembly according to claim 1, wherein the non-circular cross-section of the bore of the base member is perpendicular to the central longitudinal axis.

15. The toolholder assembly according to claim 1, wherein the locking member assists in effecting the clamping force via:
   contacting a surface of the at least one locking aperture; and
   thereby applying a force with a component in a radial direction with respect to the central longitudinal axis.

16. The toolholder assembly according to claim 15, wherein the surface of the at least one locking aperture is oriented at a non-zero and non-right angle with respect to the radial direction.

17. A toolholder assembly, comprising:
   a toolholder having a rearwardly facing toolholder shank with an internal, wherein the toolholder shank has an outer surface that has:
      an outer surface that has a cross-section comprising a tri-lobe configuration defined by three lobes; and
      at least one locking aperture that extends from the outer surface of the toolholder shank to the internal bore;
   a base member having a bore that receives the toolholder shank, wherein an axial forward portion of the bore of the base member that receives the toolholder shank has a non-circular cross-section;
   a canister configured for receipt in the bore of the base member, the canister having at least one locking passageway that extends from an outer surface of the canister to a canister bore, wherein the at least one locking passageway is in communication with the at least one locking aperture of the toolholder shank;

a lock rod having at least one depression formed adjacent an axial forward end thereof, wherein the at least one depression is in communication with the at least one locking passageway and the at least one locking aperture;

a locking ball movably positioned at least partially in the at least one depression, the at least one locking passageway and/or the at least one locking aperture; and an actuating element configured for cooperation with the lock rod for moving the lock rod between a locked position and an unlocked position;

wherein the lock rod and the locking ball cooperate in effecting a clamping force at at least one of the lobes, to secure the toolholder with respect to the base member;

wherein the locking member comprises a first locking member;

wherein the toolholder assembly further comprises second and third locking members; and wherein the lock rod cooperates with the first, second and third locking members in effecting a clamping force solely at each of the three lobes, to secure the toolholder with respect to the base member.

18. The toolholder assembly according to claim 17, wherein the non-circular cross-section of the bore of the base member is a tri-lobe configuration.

19. The toolholder assembly according to claim 17, wherein the non-circular cross-section of the bore of the base member is complimentary to the tri-lobe configuration of the outer surface of the toolholder.

20. The toolholder assembly according to claim 17, wherein the non-circular cross-section of the outer surface of the toolholder shank is perpendicular to a central longitudinal axis of the toolholder assembly and wherein the non-circular cross-section of the bore of the base member is perpendicular to the longitudinal axis.

* * * * *